United States Patent [19]

Yamakawa

[11] Patent Number: 5,309,270
[45] Date of Patent: May 3, 1994

[54] OPTICAL SCANNING SYSTEM

[75] Inventor: Hiromitsu Yamakawa, Ohmiya, Japan

[73] Assignee: Fuji Photo Optical Co., Ltd., Saitama, Japan

[21] Appl. No.: 954,907

[22] Filed: Sep. 30, 1992

[30] Foreign Application Priority Data

Feb. 5, 1992 [JP] Japan ................. 4-019938

[51] Int. Cl.⁵ .......................... G02B 26/08
[52] U.S. Cl. ..................... 359/196; 359/216
[58] Field of Search ............... 359/196, 216, 217, 218, 359/219

[56] References Cited

U.S. PATENT DOCUMENTS

| | | | |
|---|---|---|---|
| 4,310,757 | 1/1982 | Check, Jr. et al. | 359/217 |
| 4,410,234 | 10/1983 | Mikami et al. | 359/218 |
| 4,823,002 | 4/1989 | Saito | 359/218 |
| 4,978,977 | 12/1990 | Ohmori et al. | 359/217 |
| 4,982,205 | 1/1991 | Hasegawa | 359/218 |
| 5,138,479 | 8/1992 | Ando | 359/196 |
| 5,210,634 | 5/1993 | Iwama | 359/196 |

FOREIGN PATENT DOCUMENTS

| | | | |
|---|---|---|---|
| 146409 | 5/1992 | Japan | 359/216 |
| 149510 | 5/1992 | Japan | 359/216 |
| 181913 | 6/1992 | Japan | 359/216 |

Primary Examiner—John T. Kwon
Attorney, Agent, or Firm—Brumbaugh, Graves, Donohue & Raymond

[57] ABSTRACT

An optical scanning system for use in a laser printer, including a first light receiving section for controlling a scan timing and a second light receiving section for controlling the amount of scanning beam. The first light receiving section is composed of two light receiving elements, wherein they are disposed remote from each other at outsides external to both ends of an effective scan field. The second light receiving section is a single light receiving element disposed in close proximity to either of the first light receiving elements in the same scan plane. In the system, there is further provided a laser beam splitter between a light source and the combination of the first light receiving element and the second light receiving element for diffracting the laser beam into the 0th order light and the +1st order light, the former entering the first light receiving element whilst the latter entering the second light receiving element.

8 Claims, 3 Drawing Sheets

OPTICAL SCANNING SYSTEM

BACKGROUND OF THE INVENTION

1. Field of the Invention

This invention relates to an optical scanning system as employed in a laser printer and, more particularly, to an optical scanning system having a first light receiving means for controlling timing of scan and a second light receiving means for controlling the amount of a scanning beam.

2. Description of the Prior Art

An optical scanning system used in a laser printer causes the transverse scan of an image plane (hereinafter referred to as a main scan) by repetitively deflecting a light beam at high speed using a light deflector such as a polygon mirror and, at the same time, a vertical scan of the image plane (hereinafter referred to as a sub scan) by moving the image plane in the direction substantially normal to the main scan direction, thereby realizing a formation of image.

A laser printer of such a type requires very precise positioning of light beam in repetitive deflection in order to insure the quality of the image formed. To meet this demand, light receiving elements are disposed at the outside of both edges of an effective scan field so as to detect the timing of scan, whereby the scan timing is controlled in response to the detected timing.

Variations in the energy of the light beam during the scan across the image plane may sometimes result in an image inconstant in density and, hence, it is necessary to control the output of the light source by monitoring the amount of light beam in order to eliminate such variations in density. To this end, there is also provided another light receiving element, other than the elements for controlling the scan timing at a constant, so as to detect the amount of light beam, whereby the output of the light source is controlled in response to the detected amount of light beam.

Since the foregoing light receiving elements occupy predetermined physical dimensions, the necessary range to be scanned will actually be increased when the above two types of light receiving elements are aligned at the outside of the effective scan field in the scan direction. This results in a wider scan angle, a polygon mirror that will be increased in size if it is employed as the light deflector, and an optical scanning system that will be increased in size if the optical scanning system, having an fθ lens, is interposed between the light deflector and the image plane.

Since the optical path, which contributes to the formation of an image, and the optical path directed to the light receiving elements should be separated from each other, it is difficult to dispose the aforementioned light receiving elements in proximity to an image plane in terms of mechanical design, and, hence, the range of actual scan is increased.

SUMMARY OF THE INVENTION

It is therefore a general object of this invention to provide an optical scanning system having a scan angle smaller than that of an existing optical scanning system.

Another object of this invention is to provide an optical scanning system which is compact in size and inexpensive in cost.

To these ends, according to one aspect of this invention, there is provided an optical scanning system wherein the optical scan across an image plane is achieved by the deflection of a light beam by means of a light deflector, and wherein a scan timing is detected by one of two light receiving means and the amount of scanning light is detected by the other means, these two light receiving means being disposed in the scan direction at one side external to an effective scan field which is defined within the image plane, the improvement comprising:

a light beam splitting means for separating the light beam into at least two beams, the splitting means being disposed between the light deflector means and the image plane and also located where the light beam which is deflected beyond the effective scan field passes by, whereby one of the split beams produced by the light beam splitter means falls on either of the two light receiving means whilst the other split beam falls on the remaining receiving means.

The effective scan field is defined herein as an area in which an actual image is produced by scanning.

The above configuration allows each of two light beams, which are split from a single light beam, to fall on the first light receiving means and the second light receiving means, respectively. Consequently, it is possible to reduce the scan angle to such an extent that the angle covers a range of scan in which the light receiving elements are disposed only on one side external to the effective scan field.

DETAILED DESCRIPTION OF THE PREFERRED EMBODIMENTS

With reference to the accompanying drawings, an optical scanning system, according to one embodiment of the present invention, will be described in detail hereinbelow.

Figure 1:
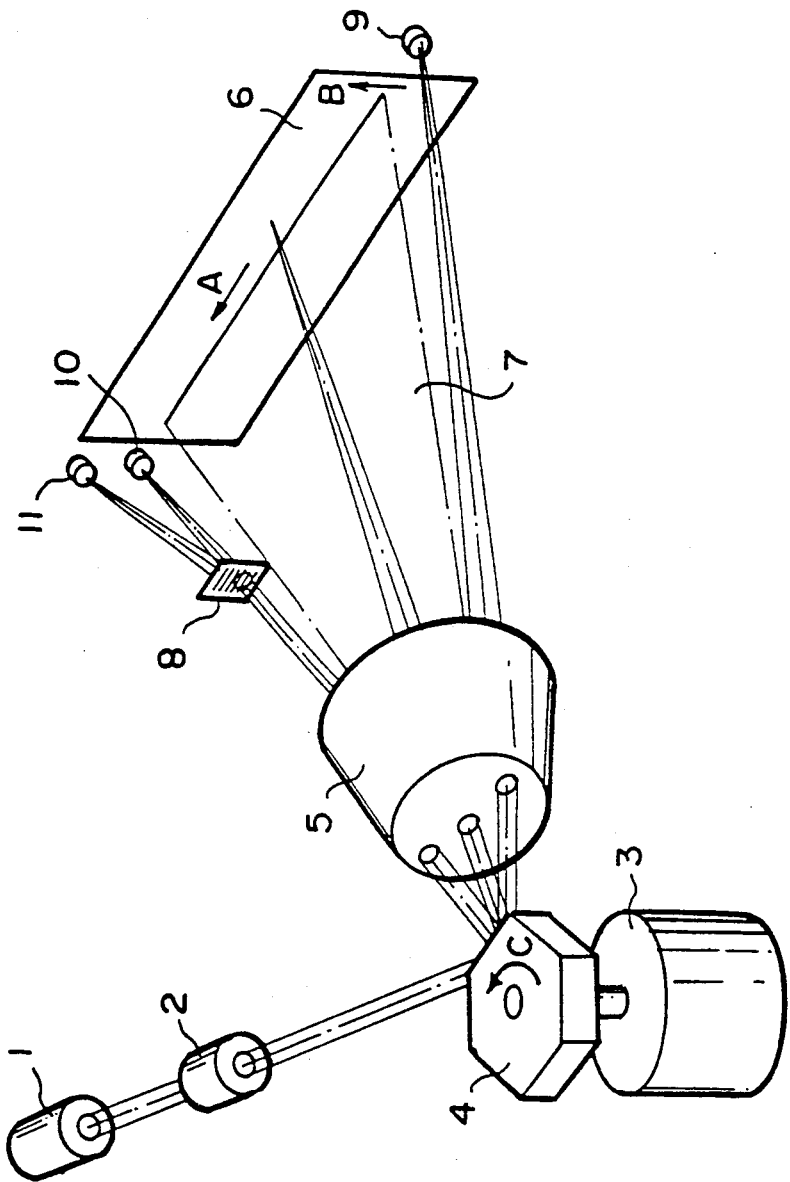
FIG. 1 is a schematic representation of an optical scanning system according to one embodiment of this invention.

FIG. 1 illustrates an optical scanning system for use in a laser printer according to a specific embodiment of this invention, wherein reference numeral 1 designates a light source for emitting a laser beam; 2, a first image configuring system for substantially collimating a luminous flux emanating from the light source 1; 3, a light deflector; 4, a polygon mirror; 5, a second image configuring optical system including an fθ lens for producing a laser beam spot on an image plane 6 from the laser beam deflected by the light deflector; 7, a plane of scan; 8, a diffraction grating disposed at the outside of the effective scan field between the light deflector 3 and the image plane 6; 9 and 10, first light receiving elements for detecting a timing signal in order to control the timing of scan as a constant; and 11, a light receiving element for monitoring the amount of the laser beam to keep the output of the laser beam constant.

The laser beam from the light source 1, which has been substantially collimated by the first image configuring optical system 2, is focused onto the image plane 6 in the form of a image by way of the second image configuring optical system 5, through the deflection and reflection by the polygon mirror 4, which is driven by the light deflecting apparatus 3. During the production of an image, a main scanning and a sub scanning of the image configuring beam are effected respectively, in the direction A and in the direction B, normal to the main scan direction, by the rotation of the polygon mirror 4 in the direction C at a constant high speed together with the movement of the image plane 6 in the direction normal to the main scan direction and at a constant speed.

As can be seen from the above, optical modulation of the laser beam by the light source 1, in response to a given image signal during the main and sub scanning of the laser beam over the image plane 6, leads to a desired image being produced.

Moreover, the timings of the optical modulation and optical scanning are adjusted in response to the receiving timing of the laser beam detected by the light receiving elements 9 and 10 disposed at the outside of the effective scan field (this field contributes to the production of an image), thereby maintaining the accurate recurrence of the main and sub scannings.

The quantity of laser beams is monitored by the light receiving element 11, so that the output of the laser beam is controlled as a constant.

Figure 2:
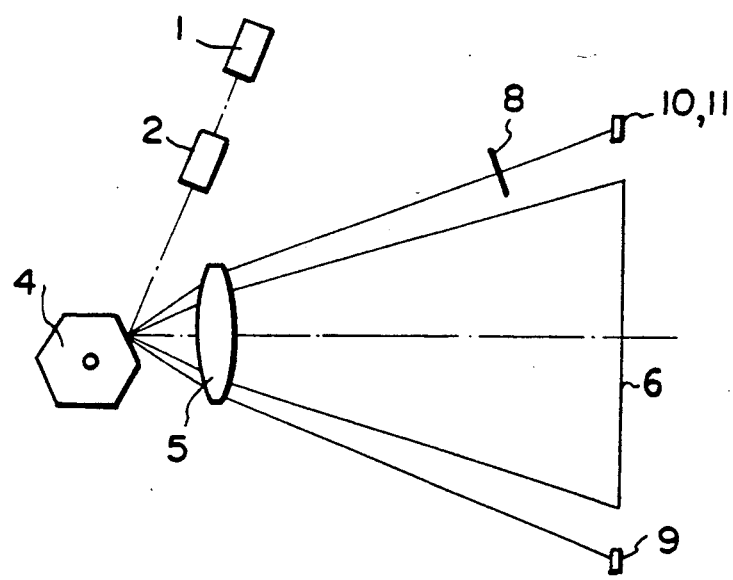
FIG. 2 is a schematic plan view showing the optical scanning system shown in FIG. 1.
Figure 3:
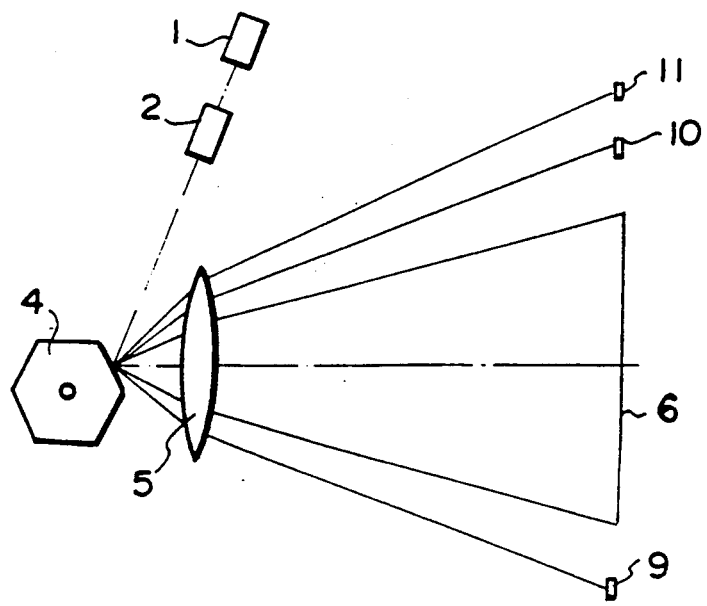
FIG. 3 is a schematic plan view showing a conventional optical scanning system.

As shown in FIG. 2, the laser beam is diffracted by the diffraction grating 8, then a 0th order beam falls on the light receiving element 10, whilst a +1st order beam falls on the light receiving element 11. Namely, in this system, a single laser beam is split into two beams; one of the beams is incident on the light receiving element 10, and the remaining beam is incident on the light receiving element 11. This arrangement leads to the scan angle of the laser beam being reduced to such an extent that the angle covers a range of scan in which either of the elements 10 or 11, instead of both elements, is only disposed at one side external to the effective scan range. Hence, the scan angle can be reduced as compared with the conventional system wherein the light receiving elements 10 and 11 are aligned in the same scan plane as shown in FIG. 3. As a result, the deflector using a polygon mirror, or the like, and the image formed by the fθ lens can be reduced in size, thereby leading to the deflector being reduced in cost.

In another embodiment, there is disposed one light receiving element for controlling a scan timing at one side external to the effective scan field and another light receiving element for controlling the amount of light at the other side external to the same. Each of the split beams emitted from the light beam splitter means falls on the respective light receiving element.

In still another embodiment, there are disposed three or more receiving elements at one side of the effective scan field. Output beams, from a light beam splitter means that is capable of separating the light beam into three or more beams, are incident on respective receiving elements.

In a further embodiment, there is provided an optical scanning system having the same structure as is set forth in the above except that the image configuring optical system interposed between the light deflector and the image plane may be omitted.

It will be understood that the optical scanning system according to this invention is not limited to the specific embodiments being set forth in the above, but that the system can be modified into various forms.

Figure 4:
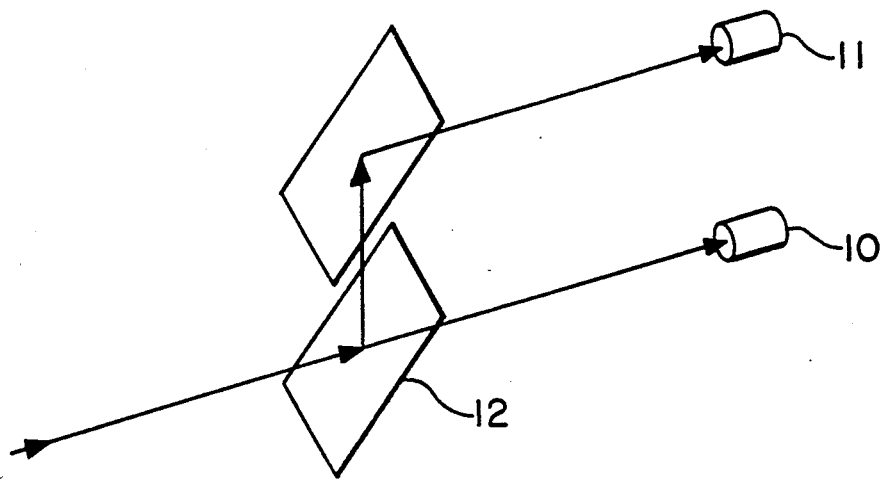
FIGS. 4 and 5 are schematic views illustrating the arrangement of alternative beam splitters for use in the optical scanning system shown in FIGS. 1 and 2.
Figure 5:
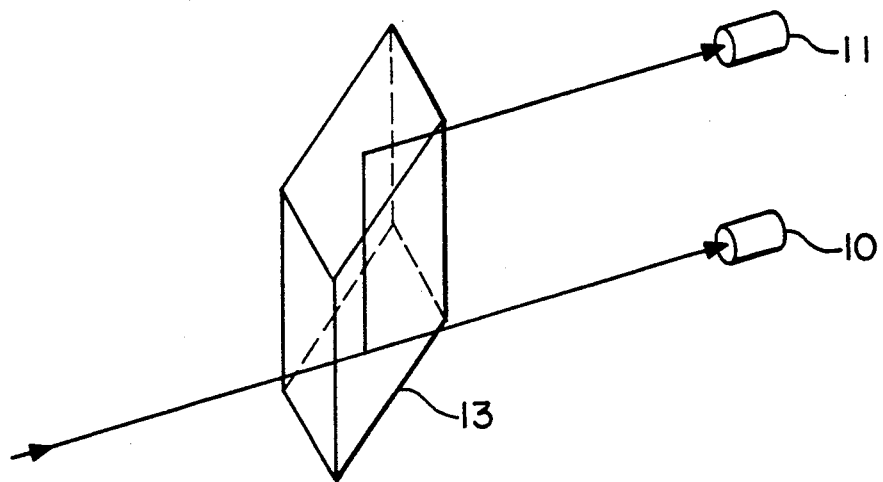

For instance, the use of the diffraction grating as the optical beam splitter means, as explained above, is preferred in view of the reduction in size of the system. However, as an alternative, another light beam splitter means, such as a half mirror 12, shown in FIG. 4, or a prism 13, shown in FIG. 5, may be employed.

In addition, the light deflector, using a polygon mirror, may be replaced with another type of deflector employing components such as galvanometers or hologram polarizing surfaces.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An optical scanning system wherein the optical scanning across an image plane is effected by the deflection of a light beam by means of a light deflector, and wherein a scan timing is detected by either of two light receiving means and the quantity of scanning light is detected by the other of the two light receiving means, theses two light receiving means being disposed in the scan direction at one side external to an effective scan field which is defined within the image plane, wherein the improvement comprises:

a light beam splitting means for separating the light beam into at least two beams, the splitting means being disposed between the light deflector means and the image plane and also located where the light beam passes after being deflected beyond the effective scan field, whereby one of the split beams produced by the light beam splitter means falls on either of the two light receiving means, whilst the other split beam falls on the other light receiving means.

2. An optical scanning system according to claim 1, wherein the light beam splitting means is a grating.

3. An optical scanning system according to claim 1, wherein the light beam splitting means is a half mirror.

4. An optical scanning system according to claim 1, wherein the light beam splitting means is a prism.

5. An optical scanning system wherein the optical scanning over a target surface is effected by the deflection of a light beam by means of a light deflector, and wherein a scan timing is detected by at least two first-type light receiving means and the quantity of scanning light is detected by a second type light receiving means, the first type light receiving means being disposed in the scan direction on both sides external to an effective scan field defined within the image plane, and the second-type light receiving means disposed on either of the sides external to the effective scanning field, wherein the improvement comprises:

a light beam splitting means for separating the light beam into at least two beams, the light beam splitting means being disposed between the light deflector means and the image plane and also located where the light beam passes after being deflected beyond the effective scan field, whereby one of the split beams produced by the light beam splitter means falls on one of the two first-type light receiving means that is situated on the same side as the second-type light receiving means, and the other split beam falls on the second-type light receiving means.

6. An optical scanning system according to claim 5, wherein the light beam splitting means is a grating.

7. An optical scanning system according to claim 5, wherein the light beam splitting means is a half mirror.

8. An optical scanning system according to claim 5, wherein the light beam splitting means is a prism.

* * * * *